Sept. 22, 1925.　　　　J. F. GIBSON　　　　1,554,341
PLOW
Filed April 17, 1924
FIG_1_
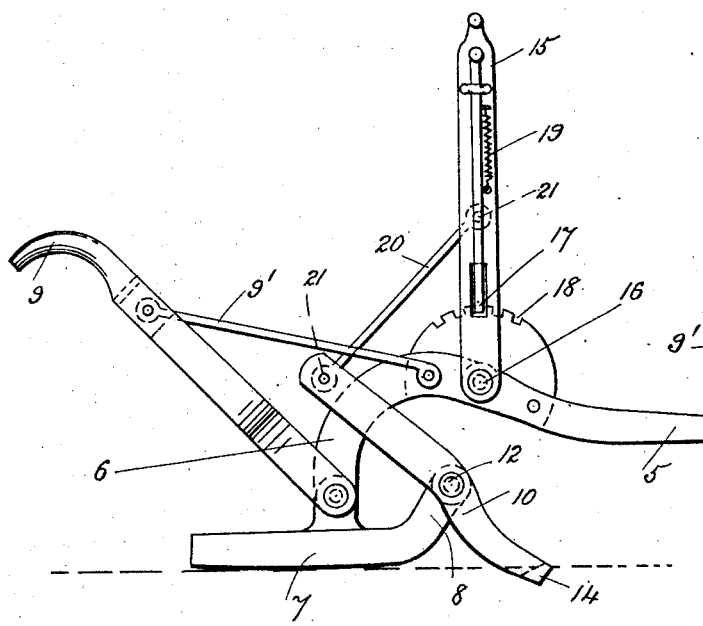
FIG_2_
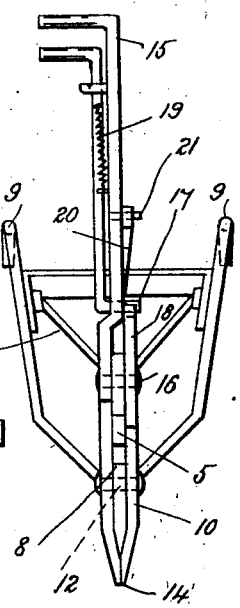
FIG_3_
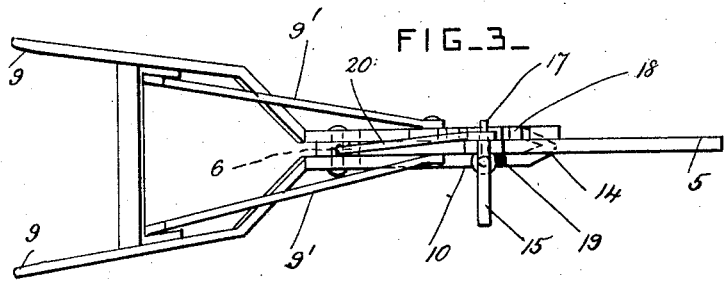
Inventor
John F. Gibson
by Robert W. Bennett.
Attorney.

Patented Sept. 22, 1925.

1,554,341

UNITED STATES PATENT OFFICE.

JOHN F. GIBSON, OF BRASHEAR, TEXAS.

PLOW.

Application filed April 17, 1924. Serial No. 707,205.

*To all whom it may concern:*

Be it known that I, JOHN F. GIBSON, a citizen of the United States, residing at Brashear, in the county of Hopkins and State of Texas, have invented certain new and useful Improvements in Plows, of which the following is a specification.

This invention relates to plows for cutting furrows in the ground; and it consists in the novel construction and combination of the parts hereinafter fully described and claimed whereby furrows of various predetermined depths may be plowed by the same implement, and the depth of the furrows changed at will.

In the drawings, Figure 1 is a side view of a plow constructed according to this invention. Fig. 2 is a front end view of the plow; and Fig. 3 is a plan view of the same.

The plow beam 5 has an arch-shaped rear end portion 6, and a horizontal guide bar 7 has its middle part secured to the rear and lower end of the part 6. The guide bar 7 has an upwardly projecting front end portion or extension 8. The plow handles 9 are secured to the part 6 close above the guide bar 7, and brace rods 9' are secured between their upper parts and the upper part of the arch-shaped portion 6. A forked arm 10 is pivoted to the front end portion 8 of the guide bar by a pin 12, and it is arranged to straddle the part 8 and the arch-shaped portion 6. The arm 10 is angle-shaped in form, and a furrow-cutting point 14 is formed on its lower and front end. If preferred a separate point for cutting the furrow can be provided, and can be secured to the arm in any approved way. The pivot pin 12 is arranged at a level about half-way between the level of the guide bar and that of the front end portion of the plow beam 5. The middle part of the arm 10 is pivoted to the pin 12, and its front end portion projects downwardly and forwardly below the pin for a considerable distance so that the plow point 14 may have a wide range of adjustment.

An adjusting lever 15 is pivoted by a pin 16 to the upper part of the arch-shaped portion 6, a little to the front of the pivot of the arm 10, and is provided with a slidable locking catch 17 for engaging with a notched quadrant plate 18 secured to the plow beam. A spring 19 is provided for holding the catch in engagement with the notches in the plate 18.

The upper and rear end portion of the forked arm 10 is connected to the upper part of the adjusting lever by a rod 20 and pivot pins 21. When the plow is drawn along the point 14 cuts a furrow in the ground, and the depth of the furrow is regulated by the guide bar 7, which keeps the depth constant. The depth of the furrow is changed at will by means of the adjusting lever which can be turned to various positions to make the point 14 project more or less below the bottom of the horizontal guide bar.

What I claim is:

In a plow, a plow beam having an arch-shaped rear end portion, a guide bar secured to the lower part of the said end portion and provided with an extension which projects upwardly and forwardly under it, a forked arm which straddles the said end portion of the plow beam and the said extension and which is pivoted to the latter, said arm having a plow point at its lower end, a notched quadrant plate secured to the plow beam over the pivot of the said arm, an adjusting lever pivoted to the plow beam and provided with a catch for engaging with the notched quadrant plate, and a connecting-rod pivoted to the upper end of the said arm and to the said adjusting lever.

In testimony whereof I have affixed my signature.

JOHN F. GIBSON.